United States Patent Office.

FREDERICK BECK, OF NEW YORK, N. Y.

Letters Patent No. 110,727, dated January 3, 1871.

IMPROVEMENT IN COATING AND DECORATING PAPER, CLOTH, AND OTHER MATERIALS.

The Schedule referred to in these Letters Patent and making part of the same.

*To all whom it may concern:*

Be it known that I, FREDERICK BECK, of the city, county, and State of New York, have invented a new and useful Improvement in Coating and Decorating Paper, Cloth, and other materials, of which the following is a specification.

I take finely powdered shellac, or other suitable substance that will melt or become adhesive when subjected to the pressure of heated surfaces, and I apply the powdered substance to paper, cloth, or other materials by the use of a brush or other suitable means, after which I cover the powdered shellac or other substance with fine scales of mica.

A convenient method is to put the scales of mica in a sieve and shake it gently, so as to insure a thin, uniform covering. I then subject the paper or other material so prepared to the action of heated dies, rolls, plates, or other surfaces, under pressure for a period of time varying according to the nature of the powdered material and of the temperature of the heated surfaces.

As a general rule, where shellac is used, and the temperature of the heated surfaces is sufficient, a pressure for about two seconds is all that is required to melt or render the shellac adhesive, whereby it attaches itself to the material to which it has been applied, and, at the same time, binds the mica firmly thereto. I then relieve the paper or other material from the pressure of the heated surfaces, and remove the superfluous mica scales from the material by means of brushes or other suitable device.

Having thus described my invention,

I claim as new and desire to secure by Letters Patent—

1. The process herein described for coating and decorating paper, cloth, and other materials, by applying thereto powdered shellac or other suitable substance, then covering the same with scales of mica and subjecting the material so prepared to the action of heated dies, rolls, plates, or other surfaces, under pressure, substantially as set forth.

2. Paper, cloth, or other materials coated or decorated with mica scales, substantially as described.

FR. BECK.

Witnesses:
 HENRY M. JOHNSTON,
 J. H. LANGE.